(12) United States Patent
Tamura et al.

(10) Patent No.: US 7,051,689 B2
(45) Date of Patent: May 30, 2006

(54) FAILURE DIAGNOSTIC SYSTEM FOR EXHAUST PRESSURE INCREASING DEVICE

(75) Inventors: Yasuki Tamura, Nisshin (JP); Kazuhito Kawashima, Okazaki (JP); Hitoshi Toda, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/808,363

(22) Filed: Mar. 25, 2004

(65) Prior Publication Data

US 2004/0244473 A1   Dec. 9, 2004

(30) Foreign Application Priority Data

Mar. 26, 2003  (JP) .............................. 2003-086286

(51) Int. Cl.
*F01L 1/34* (2006.01)

(52) U.S. Cl. .............................. 123/90.15; 123/90.16; 123/90.17; 60/324

(58) Field of Classification Search ............. 123/90.15, 123/90.17, 90.11, 90.12, 90.16; 60/277, 60/276, 285, 292, 284, 286, 324
See application file for complete search history.

(56) References Cited

U.S. PATENT DOCUMENTS 6,687,601 B1 *   2/2004   Bale et al. .................. 701/108

FOREIGN PATENT DOCUMENTS

JP          8-210123  A        8/1996

* cited by examiner

*Primary Examiner*—Thomas Denion
*Assistant Examiner*—Zelalem Eshete
(74) *Attorney, Agent, or Firm*—Birch, Stewart, Kolasch & Birch, LLP (57) ABSTRACT

There is provided a failure diagnostic system which includes an intake channel and an exhaust channel in communication with cylinders of an internal combustion engine; the exhaust pressure increasing device that increases the exhaust system pressure of the exhaust channel; an intake system pressure detecting device provided in the intake channel, for detecting the intake system pressure; and an exhaust pressure increase failure diagnostic section that determines whether the exhaust pressure increasing device has failed or not according to intake system pressure information obtained by the intake system pressure detecting device and a predetermined failure diagnosis reference range.

14 Claims, 9 Drawing Sheets

FAILURE DIAGNOSTIC SYSTEM FOR EXHAUST PRESSURE INCREASING DEVICE

CROSS-REFERENCE TO RELATED APPLICATION

This application incorporates by references the subject matter of Application No. 2003-086286 filed in Japan on 26 Mar. 2003, on which a priority claim is based under 35 U.S.C. § 119(a).

BACKGROUND OF THE INVENTION

1. Field of the Invention

The present invention relates to a failure diagnostic system for an exhaust pressure increasing device, and more particularly to a failure diagnostic system for an exhaust pressure increasing device which is applied to exhaust flow control intended for reducing the emission of exhaust gas.

2. Description of the Related Art

As a technique for reducing the emission of unburned substances such as HC and CO and exhaust gas substances such as $NO_x$, an exhaust gas emission reducing technique which utilizes reaction caused by a catalyst has been known. According to this technique, the flow of exhaust gas is controlled to prevent unburned substances such as HC from being emitted before the catalyst is activated.

It is known that exhaust flow control is provided in e.g., an exhaust pressure increasing device provided in an exhaust channel of an internal combustion engine. The exhaust pressure increasing device is comprised of an exhaust throttle valve, an actuator which actuates the exhaust throttle valve, and so forth; the passage area of the exhaust channel is varied by changing the angle of opening of the exhaust throttle valve so as to increase the exhaust pressure of an exhaust pressure increasing part located upstream of the exhaust throttle valve. The increase in exhaust pressure promotes the reaction of the unburned substances and oxygen in an exhaust system which extends from a combustion chamber to the exhaust channel, and reduces the emission of the unburned gas substances and realizes quick activation of the catalyst.

Since the exhaust pressure increasing device is important for reducing the emission of the exhaust gas substances and realizing quick activation of the catalyst as described above, it is necessary to promptly and properly cope with a failure in the exhaust pressure increasing device.

To determine whether the exhaust pressure increasing device has failed or not, it can be envisaged that an exhaust system pressure sensor (exhaust pressure sensor) is disposed upstream of the exhaust pressure increasing part so that whether a failure has occurred or not can be determined according to whether the exhaust pressure detected by an exhaust pressure sensor lies within a predetermined range or not. A technique relating to a construction in which an exhaust pressure sensor is provided which detects the exhaust pressure in an exhaust channel has been proposed, for example, in Japanese Laid-Open Patent Publication (Kokai) No. 8-210123 (e.g., paragraph [0016] and FIG. 1)).

According to this technique, the exhaust pressure sensor which detects the exhaust pressure is disposed at an end of a port (cooling pipe) which branches off from the exhaust channel of an exhaust system. With this arrangement, whether the exhaust increasing apparatus has failed or not can be determined by detecting the exhaust pressure of the exhaust pressure increasing part.

By the way, the exhaust pressure sensor is required to have a resistance to heat since it has to detect the pressure of high-temperature exhaust gas at a position upstream of the exhaust pressure increasing part. Moreover, the exhaust pressure sensor is in communication with the exhaust channel so as to detect the pressure of the exhaust pressure increasing part, and hence the exhaust pressure sensor is also required to have a resistance to corrosion caused by condensed water in exhaust gas. Particularly, in an engine for which fuel with sulfur with a high concentration is used, the exhaust pressure sensor is likely to corrode due to a high acidity of the condensed water. Therefore, the exhaust pressure sensor disposed in the exhaust system needs to be specially configured to have a resistance to heat and a resistance to corrosion, and is expensive as a result.

Here, to satisfy the requirements such as a resistance to heat, it can be envisaged that the exhaust pressure sensor is not disposed directly in the exhaust channel through which high-temperature exhaust gas passes, but is disposed at the end of the cooling pipe which branches off from the exhaust channel as in the above described prior art. According to this arrangement, exhaust gas taken out from the exhaust channel can be cooled, but the cooling pipe where the exhaust pressure sensor is disposed is required to have a length sufficient to withstand high-temperature exhaust gas, and thus the cooling pipe as well as the exhaust pressure sensor itself needs to be configured to have a resistance to heat, which leads to cost increase. Further, the problem may arise in terms of the vibration-resisting property of the cooling pipe connected to the exhaust channel.

As described above, if the exhaust pressure sensor disposed in the exhaust system detects the pressure of the exhaust pressure increasing section so as to determine whether the exhaust pressure increasing section has failed or not as in the prior art, the problem arises in terms of the detecting accuracy of the exhaust pressure sensor laid under unfavorable conditions.

SUMMARY OF THE INVENTION

It is therefore an object of the present invention to provide a failure diagnostic system for an exhaust pressure increasing device, which employs an intake system pressure sensor which is not required to have a resistance to corrosion and a resistance to heat as compared with an exhaust system pressure sensor, and therefore makes it possible to diagnose a failure in the exhaust pressure increasing device.

To attain the above object, there is provided a failure diagnostic system which includes an intake channel and an exhaust channel in communication with cylinders of an internal combustion engine; the exhaust pressure increasing device that increases the exhaust system pressure of the exhaust channel; an intake system pressure detecting device provided in the intake channel, for detecting the intake system pressure; and an exhaust pressure increase failure diagnostic section that determines whether the exhaust pressure increasing device has failed or not according to intake system pressure information obtained by the intake system pressure detecting device and a predetermined failure diagnosis reference range.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE INVENTION

The present invention will now be described in detail with reference to the accompanying drawings showing preferred embodiments thereof.

Figure 1:
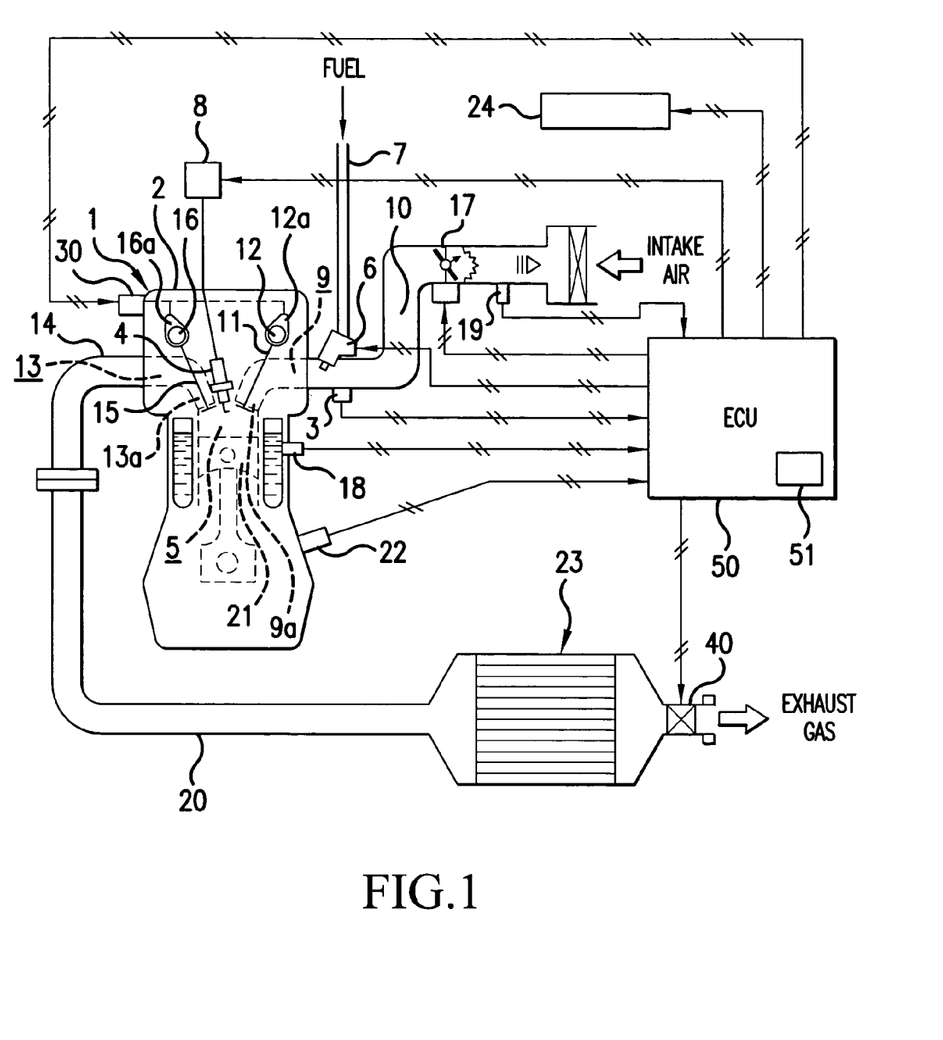
FIG. 1 is a diagram showing the arrangement of an engine system to which a failure diagnostic system for an exhaust pressure increasing device according to a first embodiment of the present invention is applied.

FIG. 1 is a diagram showing the arrangement of an engine system for a vehicle, to which a failure diagnostic system for an exhaust pressure increasing device according to a first embodiment of the present invention is applied. Referring to FIG. 1, a description will now be given of the construction of the failure diagnostic system for the exhaust pressure increasing device according to the first embodiment of the present invention.

For example, a multi-point injection type engine (MPI type engine) capable of injecting fuel via an intake port 9 is employed as an internal combustion engine (hereinafter referred to as "engine") 1 used for the failure diagnostic system for the exhaust pressure increasing device according to the present embodiment.

As shown in FIG. 1, a cylinder head 2 of each cylinder in the engine 1 is formed with the intake port 9 in a substantially horizontal direction, and an intake valve 11 which causes each intake port 9 to come into or out of communication with a combustion chamber 5 is provided on the combustion chamber 5 side of each intake port 9. Each intake valve 11 is actuated to open and close an intake opening 9a in accordance with the movement of a cam 12a of a cam shaft 12 rotating in response to engine revolution. An electromagnetic injector 6 which injects fuel into each cylinder is mounted on each intake port 9, and a fuel supply device, not shown, including a fuel tank is connected to the injector 6. The injector 6 injects fuel toward the combustion chamber 5 in an exhaust stroke of a piston 21.

One end of an intake manifold 10 is connected to each intake port 9. An intake pipe pressure sensor (intake system pressure detecting device) 3 which detects the intake system pressure is provided at a suitable position of the intake manifold 10. An electromagnetic throttle valve 17 which adjusts the intake air quantity is provided upstream of the intake pipe pressure sensor 3. A Karman vortex air flow sensor 19 which detects the intake air quantity is provided upstream of the throttle valve 17.

An ignition plug 4 is attached to the cylinder head 2 of each cylinder, and an ignition coil 8 which outputs a high voltage is connected to an ignition plug 4. A mixture of fresh air taken from the intake manifold 10 and fuel injected from the injector 6 is spark-ignited in the combustion chamber 5.

Further, the cylinder head 2 of each cylinder is formed with an exhaust port 13 in a substantially horizontal direction, and an exhaust valve 15 which brings each exhaust port 13 into and out of communication with the combustion chamber 5 is provided on the combustion chamber 5 side of each exhaust port 13. The exhaust valve 15 is actuated to open and close an exhaust opening 13a in accordance with the movement of a cam 16a of a cam shaft 16 rotating in response to engine revolution.

One end of an exhaust manifold 14 is connected to each exhaust port 13. An exhaust pipe 20 is connected to the other end of the exhaust manifold 14, and a three-way catalyst 23 which is capable of purifying HC, CO, and $NO_x$ with a high efficiency at an air-fuel ratio close to a stoichiometric air-fuel ratio is disposed in the exhaust pipe 20.

Further, the exhaust pressure increasing device capable of adjusting the passage area of the exhaust pipe 20 is disposed downstream of the three-way catalyst 23. The exhaust pressure increasing device is comprised of a sealed type switching valve 40, an actuator, not shown, which actuates the sealed type switching valve 40, and so forth, and is configured to change the angle of opening (passage area) of the exhaust pipe 20 to increase the exhaust system pressure, thereby accelerating reduction in the emission of unburned substances such as HC and CO and exhaust gas substances such as $NO_x$. The exhaust pressure increasing device is capable of changing the exhaust pressure. A variety of types may be envisaged as the sealed type switching valve 40, and in the present embodiment, it is assumed that a butterfly valve is employed. The butterfly valve is configured to adjust the passage area of the exhaust pipe 20 by rotating a disc about a shaft penetrated through the exhaust pipe 20. The sealed type switching valve 40 is electrically connected to an electronic control unit (ECU) 50 via the actuator.

Further, the cylinder head 2 is provided with a variable valve timing mechanism (variable valve timing device) 30 which operates the cam 12a and the cam 16a to retard and advance the opening/closing timing of the intake valve 11 and the exhaust valve 15 by hydraulic control. For example, a swing variable valve timing mechanism which swings the cam shafts 12 and 16 is employed as the variable valve timing mechanism 30. It should be noted that the swing variable valve timing mechanism is publicly known, and detailed description thereof is therefore omitted.

The ECU 50 is provided with an input/output device, a storage device, a central processing unit (CPU), and so forth, and controls the overall operation of the engine 1.

A variety of sensors such as the intake pipe pressure sensor 3, air flow sensor 19, a water temperature sensor 18 which detects the temperature of cooling water in the engine 1, and a crank angle sensor 22 which detects the crank angle are connected to the input side of the ECU 50, so that detection information supplied from these sensors are input to the ECU 50. Further, a predetermined failure diagnosis reference range is stored in the storage device of the ECU 50 according to the present embodiment. The predetermined failure diagnosis reference range is an exhaust pressure range between the upper limit value and the lower limit value which are set according to the extent to which the exhaust pipe 20 is throttled by the sealed type switching valve 40. The predetermined failure diagnosis reference range is influenced by the engine speed or the like, and is obtained in advance by experiments or the like.

On the other hand, a variety of output devices such as the injector 6, ignition coil 8, throttle valve 17, variable valve timing mechanism 30, and failure alarm lamp 24 (failure notifying device) are connected to the output side of the ECU 50, so that signals indicative of fuel injection quantity, fuel injection timing, ignition timing, and throttle valve opening are output to the injector 6, ignition coil 8, and throttle valve 17 according to detection information supplied from the above sensors. As a result, a proper quantity of fuel is injected in proper timing from the injector 6, spark-ignition is carried out in proper timing by the ignition plug 4, and the throttle valve opening is controlled to a proper valve opening. Further, a proper valve timing instruction is given to the variable valve timing mechanism 30, and a failure of the exhaust pressure increasing device is notified to the driver.

Particularly in the failure diagnostic system for the exhaust pressure increasing device according to the present invention, the ECU 50 is provided with an exhaust pressure increase failure diagnostic section 51 which makes a determination as to whether the exhaust pressure increasing device has failed or not according to intake system pressure information obtained by the intake pipe pressure sensor 3 and the predetermined failure diagnosis reference range. The exhaust pressure increase failure diagnostic section 51 detects the pressure of spit-back to an intake system as intake system pressure information, and identifies the detected pressure as the exhaust system pressure to make a determination as to whether the exhaust pressure increasing device has failed or not.

More specifically, the exhaust pressure failure diagnostic section 51 according to the present embodiment is provided with an execution permitting section and a comparing/determining section.

When the amount of overlap between valve closing timing of the exhaust valve 15 and valve opening timing of the intake valve 11 is equal to a predetermined failure diagnosis mode amount, the execution permitting section outputs an execution permission signal indicative of permission to determine whether the exhaust pressure increasing device has failed or not to the comparing/determining section.

Upon receipt of the execution permission signal from the execution permitting section, the comparing/determining section determines whether the exhaust pressure increasing device has failed or not according to intake system pressure information obtained by the intake pipe pressure sensor 3 and the predetermined failure diagnosis reference range. Specifically, the comparing/determining section compares the maximum value of the intake system pressure in a predetermined period of time from a starting time point of communication between the combustion chamber 5 in which the intake valve 11 is opened and the intake port 9 with the predetermined failure diagnosis reference range, and determines that the exhaust pressure increasing device has failed when the maximum range of intake system pressure lies outside the predetermined failure diagnosis reference range, and outputs a signal indicative thereof to the failure alarm lamp 24.

Figure 2:
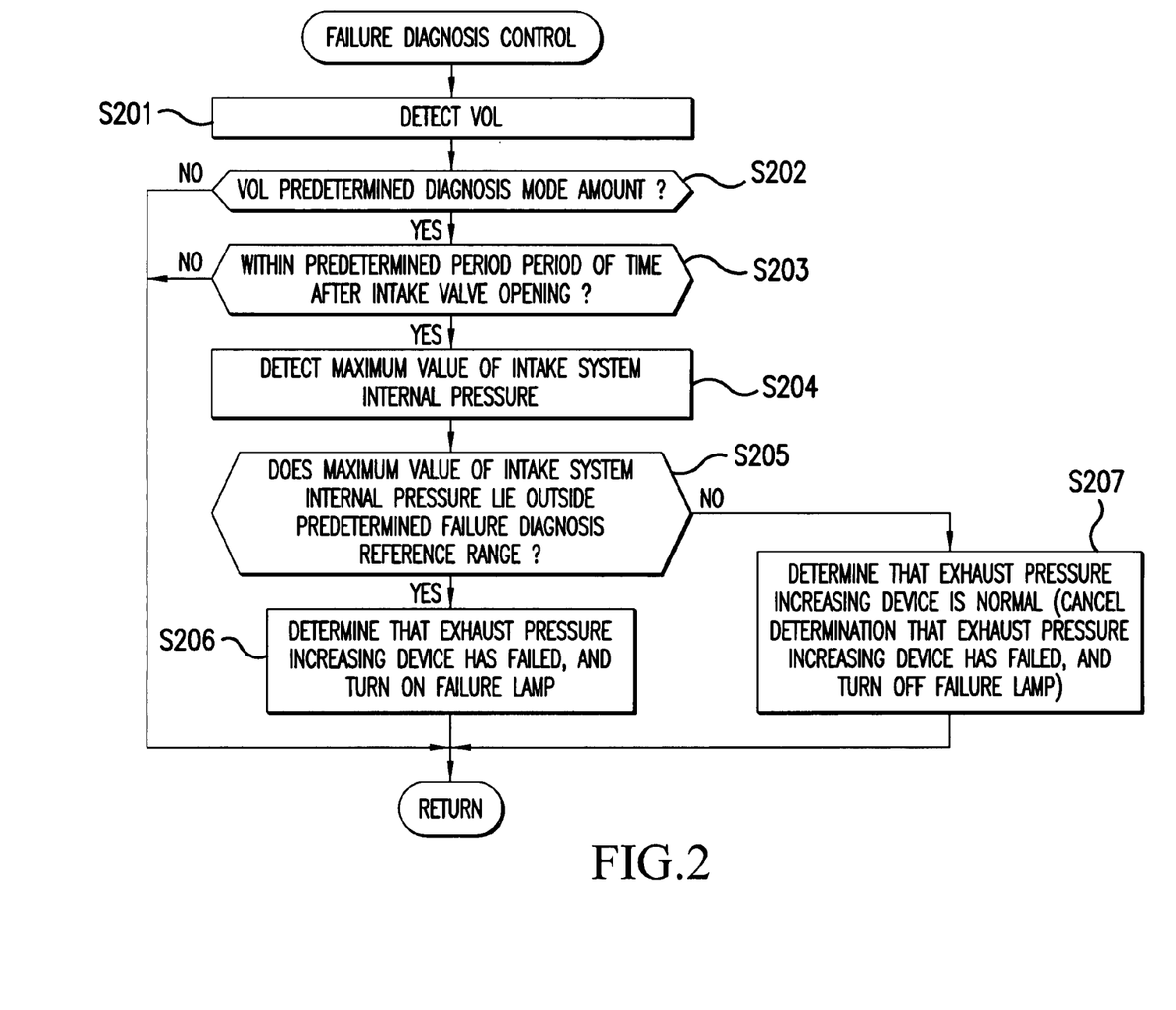
FIG. 2 is a flow chart showing a failure diagnosis control process carried out by the failure diagnostic system in FIG. 1.

FIG. 2 is a flow chart showing a failure diagnosis control process carried out by the exhaust pressure increase failure diagnostic section 51. A description will now be given of the procedure of the failure diagnosis control process carried out by the failure diagnostic system for the exhaust pressure increasing device according to the present invention.

In step S201, the amount of overlap VOL of valve closing timing of the exhaust valve 15 and valve opening timing of the intake valve 11 is detected, and in step S202, the execution permitting section determines whether or not the amount of overlap VOL is equal to or greater than a predetermined determination mode amount. The predetermined determination mode amount is the amount of overlap for reducing the influence of the displacement of the piston 21 on the intake system pressure or for surely supplying exhaust pressure information to the intake system, and is set to be equal to or greater than a predetermined value. If it is determined that the amount of overlap VOL is equal to or greater than the predetermined determination mode amount, i.e., if the determination result is positive (YES), the process proceeds to step S203. On the other hand, if it is determined that the amount of overlap VOL is not equal to or greater than the predetermined determination mode amount, the present routine is brought to an end.

In step S203, the execution permitting section determines whether or not the elapsed time is equal to or less than a predetermined period of time from a starting time point of communication between the combustion chamber 5 and the intake port 9. If it is determined that the elapsed time is equal to or less than the predetermined period of time, i.e., if the determination result is positive (YES), the process proceeds to step S204 wherein the maximum value of intake system pressure detected by the intake pipe pressure sensor 3 at the present time point. The process then proceeds to step S205. On the other hand, in step S203, if it is determined that the elapsed time is not equal to or less than the predetermined period of time after the intake valve 11 is opened, the present routine is brought to an end.

Figure 3:
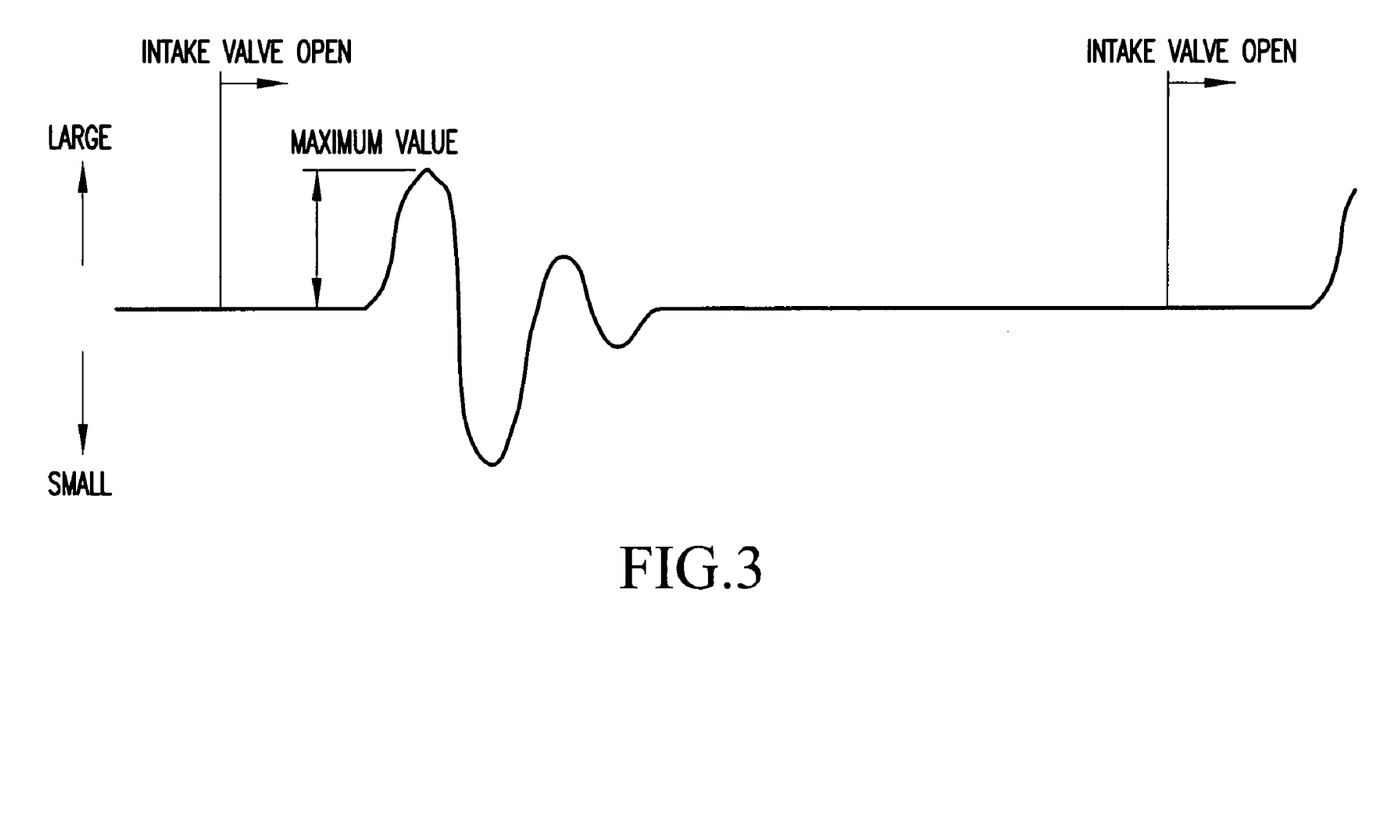
FIG. 3 is a diagram showing intake system pressure information obtained by the failure diagnostic system in FIG. 1.

FIG. 3 is a diagram showing intake system pressure information detected in step S204.

As shown in FIG. 3, in the present embodiment, intake system pressures within the predetermined period of time after the intake valve 11 is opened are detected, and the maximum value of the detected intake system pressures is used to determine whether the exhaust pressure increasing device has failed or not. Specifically, when the intake valve 11 is opened, gas in the combustion chamber 5 is spit-back toward the intake port 9 to increase the pressure of the intake system. Then, the pressure of the intake system rises as the degree of throttle controlled by the sealed type switching valve 40 increases, and moreover, the pressure of the intake system varies according to pulsation such as exhaust pulsation or intake pulsation. For this reason, the maximum point reached from a reference value as the pressure immediately before the occurrence of such pulsation can be regarded as the maximum value. It should be noted that the exhaust system pressure is generally higher than the intake system pressure, and hence the intake system pressure can be changed as stated above by opening of the intake valve 11 irrespective of whether overlap is caused by the variable valve timing mechanism 30.

Then, in step S205, the comparing/determining section determines whether or not the maximum value of the intake system pressure lies outside a predetermined failure diagnosis reference range. If it is determined that the maximum value of the intake system pressure lies outside the predetermined failure diagnosis reference range, i.e., if the determination result is positive (YES), the process proceeds to step S206 wherein it is determined that the exhaust pressure increasing device has failed, and a signal indicative of a turning-on instruction is output to the failure alarm lamp 24. The present routine is then brought to an end. The predetermined failure diagnosis reference range is the range of exhaust pressures set according to the set extent to which the exhaust pipe 20 is throttled, and is set according to the amount of overlap VOL, engine speed Ne, intake air quantity, atmospheric pressure, and so forth as well as the extent to which the exhaust pipe 20 is throttled. If the maximum value of the intake system pressure is greater than pressures within the range of predetermined failure diagnosis reference range, it is determined that the exhaust pressure increasing device has failed since the amount of throttle by the sealed type switching valve 40 is excessively large, and on the other hand, if the maximum value of the intake system pressure is lower than pressures within the range of predetermined failure diagnosis reference range, it is determined that the exhaust pressure increasing device has failed since the amount of throttle by the sealed type switching valve 40 is excessively small. It should be noted that if the maximum value of the intake system pressure is greater than pressures within the range of predetermined failure diagnosis reference range, it can be assumed that the exhaust pressure increasing device has failed since a bypass channel, not shown, does not increase the exhaust pressure to a predetermined value or greater.

If it is determined in step S205 that the maximum value of the intake system pressure lies inside the predetermined failure diagnosis reference range, the process proceeds to step S207 wherein it is determined that the amount of throttle by the sealed type switching valve 40 is proper, and it is determined that the exhaust pressure increasing device is normal. In the case where failure diagnosis was previously carried out, the determination that the exhaust pressure increasing device has failed is canceled, and a signal indicative of a turning-off instruction is output to the failure alarm lamp 24. The present routine is then brought to an end.

As described above, in the failure diagnostic system for the exhaust pressure increasing device according to the first embodiment of the present invention, the intake pipe pressure sensor 3 detects the maximum value of intake system pressure within a predetermined period of time after a starting time point of communication between the combustion chamber 5 and the intake port 9, and the detected maximum value is identified as the exhaust system pressure to determine whether the exhaust pressure increasing device has failed or not. Therefore, a high resistance to heat and a high resistance to corrosion being not required as compared with the case where the exhaust pressure sensor disposed in the exhaust system is used, and the condition of the exhaust pressure increasing part can be correctly recognized. As a result, whether the exhaust pressure increasing device has failed or not can be determined at a low cost and with a high accuracy.

It should be noted that the predetermined period of time in step S203 is set so that whether the exhaust pressure increasing device has failed or not can be determined with the highest accuracy. The predetermined period of time depends on the specification of the engine 1, but for example, the overlap period is set as the predetermined period of time. In this case, if there is no overlap, the throttle valve opening is set to 60 degrees. Alternatively, the predetermined period of time in step S203 can be set according to a predetermined crank angle detected by the crank angle sensor 22.

Further, in step S205, the predetermined failure diagnosis reference range is also set so that whether the exhaust pressure increasing device has failed or not can be determined with the highest accuracy. The predetermined failure diagnosis reference range depends on the specification of the engine 1. In step S205, if a single reference range is used as the predetermined failure diagnosis reference range, it is possible to carry out diagnosis as to failures caused by sticking of the sealed type switching valve 40 on the high exhaust pressure side among failures caused by malfunction of the sealed type switching valve 40 of the exhaust pressure increasing device, but it is difficult to carry out diagnosis as to other failures. To address this problem, a plurality of different reference ranges are used for the case where the sealed type switching valve 40 is instructed to operate and the case where the sealed type switching valve 40 is not instructed to operate, making it possible to carry out diagnosis as to all failures caused by malfunction of the sealed type switching valve 40. For example, by changing the reference range according to the valve opening (the degree of throttle) specified for the sealed type switching valve 40, it is possible to carry out diagnosis as to failures caused by malfunction of the sealed type switching valve 40. Alternatively, diagnosis may be carried out only in the case where the sealed type switching valve 40 is instructed to operate. It should be noted that if a plurality of different reference ranges are used for the case where the sealed type switching valve 40 is instructed to operate and the case where the sealed type switching valve 40 is not instructed to operate, it is possible to carry out failure diagnosis when the sealed type switching valve 40 does not operate, and also to carry out diagnosis as to failures on the high exhaust pressure side such as the above-mentioned sticking with a higher accuracy.

Further, although in the present embodiment, it is determined in step S206 that the exhaust pressure increasing device has failed each time the determination is made in step S205, the present invention is not limited to this, but in step S206, it may be determined that the exhaust pressure increasing device has failed when the conditions in step S205 have been satisfied a predetermined number of times (for example, N times) in succession, and in step S207, the determination that the pressure increasing device has failed may be canceled when the conditions are not satisfied a predetermined number of times (for example, M times) in succession.

Figure 4A:
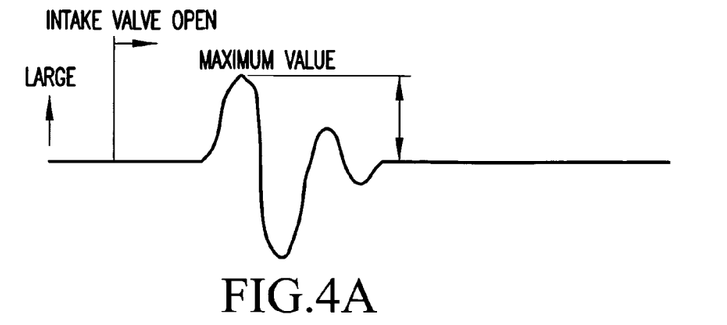
FIGS. 4A to 4D are diagrams showing other intake system pressure information obtained by the failure diagnostic system in FIG. 1.
Figure 4B:
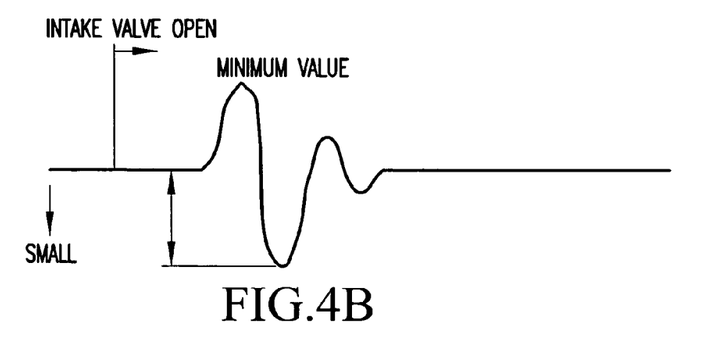
Figure 4C:
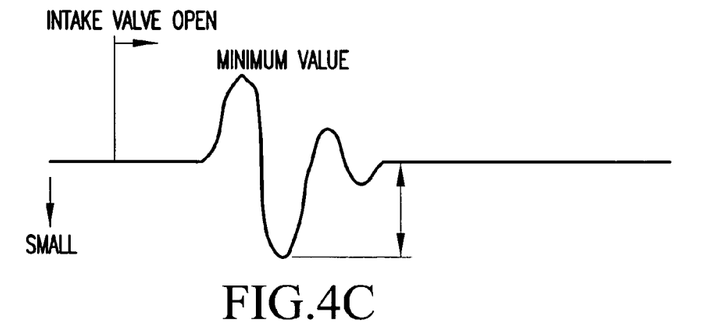
Figure 4D:
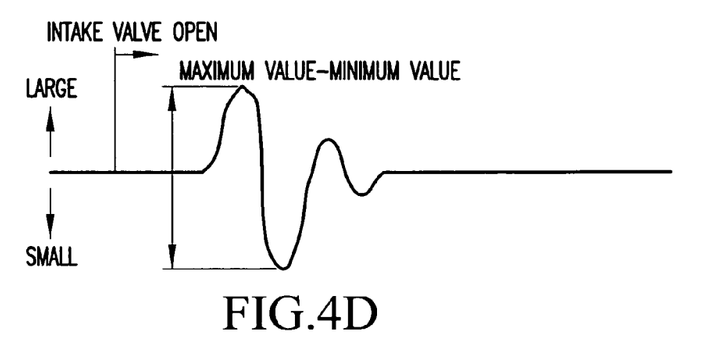

Further, in the present embodiment, the maximum value of intake system pressure based on a reference value as the pressure immediately before the occurrence of exhaust pulsation is used as shown in FIG. 3, the present invention is not limited to this. For example, intake pressure system information as follows may be used to be compared with the predetermined failure diagnosis reference range; the highest point reached from the pressure immediately before the occurrence of exhaust pulsation as a reference value is regarded as the maximum value of intake system pressure (refer to FIG. 4A), the lowest point reached from the pressure immediately before the occurrence of exhaust pulsation as a reference value is regarded as the minimum value of intake system pressure (refer to FIG. 4B), the lowest point reached from the pressure immediately after the end of exhaust pulsation as a reference value is regarded as the minimum value of intake system pressure (refer to FIG. 4C), or the highest point reached from the pressure immediately before the occurrence of exhaust pulsation as a reference value is regarded as the maximum value of intake system pressure, the lowest point reached from the pressure immediately before the occurrence of exhaust pulsation as a reference value is regarded as the minimum value of intake system pressure, and a difference between the maximum value and the minimum value is used (refer to FIG. 4D).

Figure 5A:
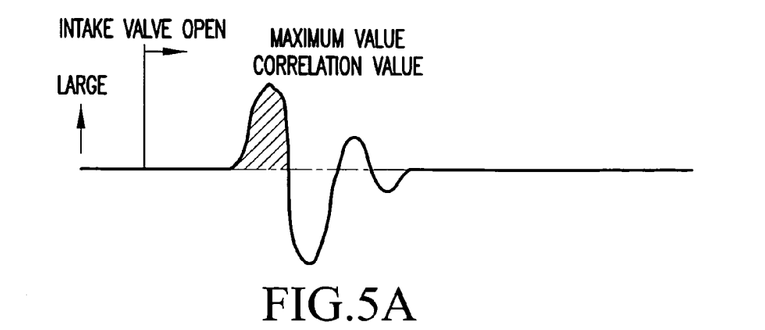
FIGS. 5A to 5D are diagrams showing still other intake system pressure information obtained by the failure diagnostic system in FIG. 1.
Figure 5B:
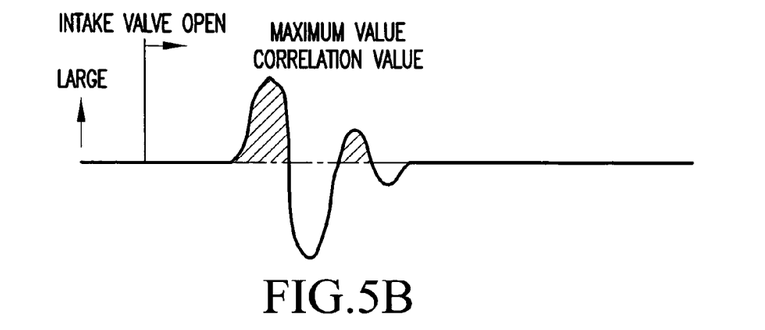
Figure 5C:
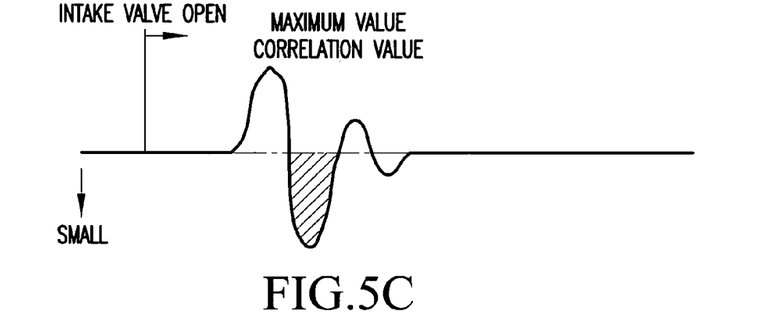
Figure 5D:
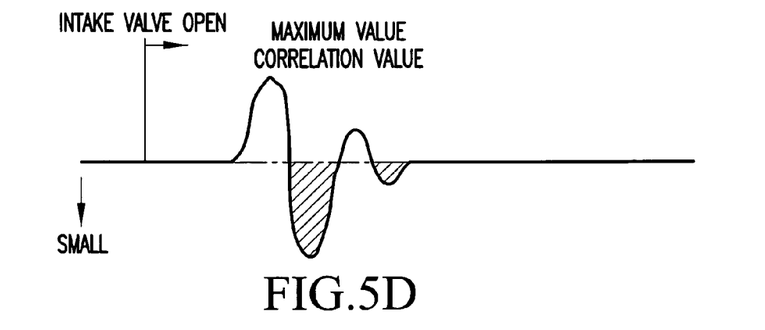

Further, intake pressure system information as follows may be used to be compared with the predetermined failure diagnosis reference range; pressures in the waveform section including the maximum value of intake system pressure as shown in FIG. 3 are integrated to obtain the maximum value correlation value of intake system pressure (refer to FIG. 5A), pressures in part of the waveform higher than the pressure (reference value) immediately before the occurrence of exhaust pulsation are integrated to obtain the maximum value correlation value of intake system pressure (refer to FIG. 5B), pressures in the waveform section including the minimum value of intake system pressure are integrated to obtain the minimum value correlation value of intake system pressure (refer to FIG. 5C), or pressures in part of the waveform lower than the pressure (reference value) immediately before the occurrence of exhaust pulsation are integrated to obtain the minimum value correlation value of intake system pressure (refer to FIG. 5D).

Further, as intake system pressure information, not only the maximum value or minimum value of intake system pressure as shown in FIG. 3, but also the average value of maximum values or minimum values correlated to the maximum value or minimum value of intake system pressure, the average pressure in a predetermined period of time or the average value of average pressures correlated to the average pressure, or the pressure increase rate or the average value of pressure increase rates correlated thereto may be used. Further, an instantaneous value as mentioned above may be used, but if the average value of instantaneous values in a predetermined period of time (for example, 20 cycles), it is possible to prevent the detecting accuracy from being deteriorated by variations. It should be noted that in the case where the detection accuracy is low due to a long sampling cycle for which intake pressure information is obtained, pressure information can be obtained by adding a sample-hold circuit, a Hi pass filter or the like.

Further, to improve the accuracy in determining whether the exhaust pressure increasing device has failed or not, it is preferred that the influence of intake system pressure which varies according to various operating conditions is excluded, i.e., it is preferred that, for example, the maximum value of intake system pressure is found using a value which is obtained by subtracting a reference pressure as described below from the pressure detected by the intake pipe pressure sensor. It should be noted that the reference pressure may be either absolute pressure or relative pressure.

Specifically, the detection value obtained by the intake pipe pressure sensor 3 immediately before the opening of the intake valve 11, the average value of detection values obtained by the intake pipe pressure sensor 3, the average value of detection values obtained by the intake pipe pressure sensor 3 during one cycle from the present opening to the next opening of the intake valve 11, or the average value of detection values obtained by the intake pipe pressure sensor 3 in a period of time except for a predetermined period of time after the opening of the intake valve 11 in step S203 can be used as the reference pressure.

Figure 6:
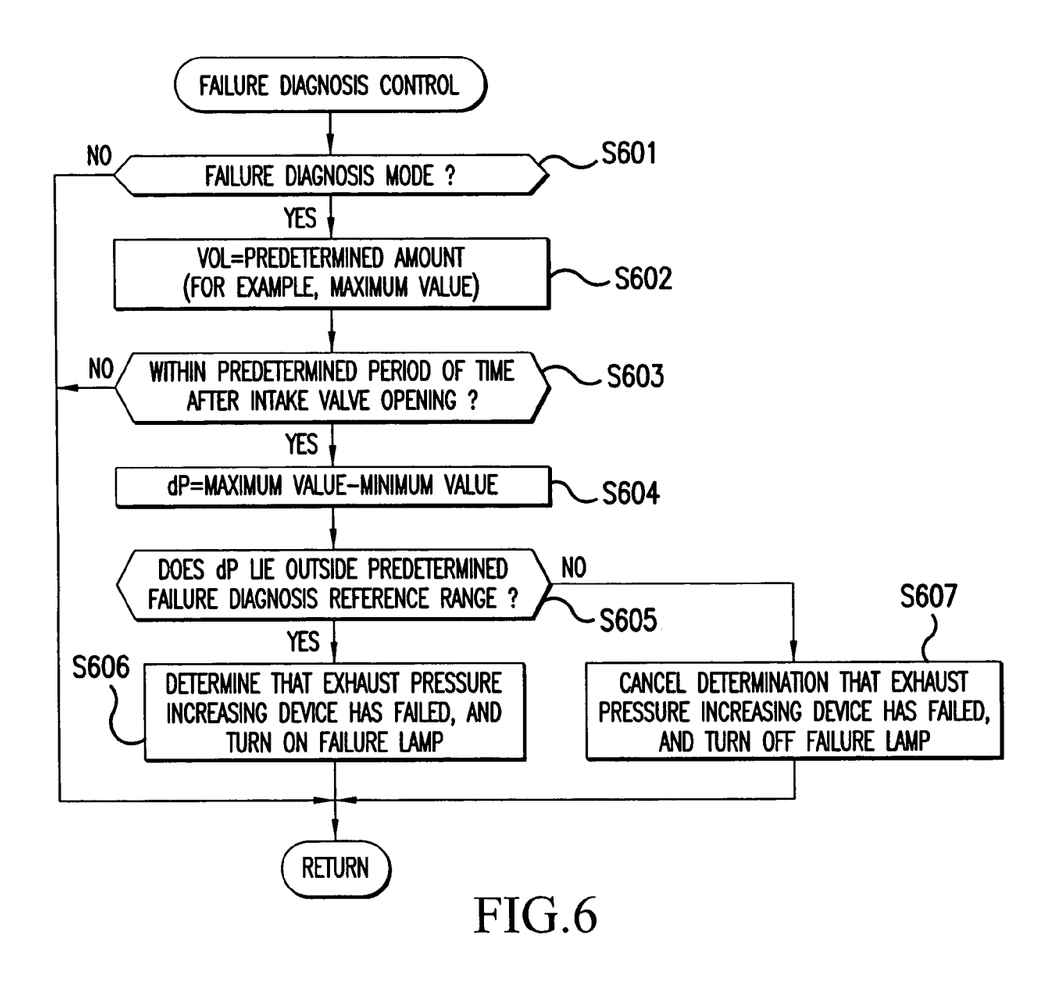
FIG. 6 is a flow chart showing a failure diagnosis control process carried out by a failure diagnostic system for an exhaust pressure increasing device according to a second embodiment of the present invention.

FIG. 6 is a flow chart showing a failure diagnosis control process carried out by a failure diagnostic system for an exhaust pressure increasing device according to a second embodiment of the present invention. It should be noted that the construction of the exhaust pressure increasing device according to the second embodiment is substantially identical with that of the exhaust pressure increasing device according to the first embodiment, and therefore description thereof is omitted, and the procedure of the failure diagnosis control process will be described below.

In step S601, the execution permitting section determines whether a failure diagnosis mode is set or not. Specifically, the execution permitting section detects the amount of overlap VOL of the valve closing timing of the exhaust valve 15 and the valve opening timing of the intake valve 11, and determines whether or not the amount of overlap VOL is equal to or greater than the amount of overlap (predetermined diagnosis mode amount) for reducing the effects of displacement of the piston 21 on the pressure. It should be noted that whether the failure diagnosis mode is set or not may be determined according to whether the vehicle is steadily running or not, or whether the engine speed is stable or not. If it is determined that the failure diagnosis mode is set, i.e., if the determination result is positive (YES), the execution of failure diagnosis is permitted so as to detect intake system pressure information, and then the process proceeds to step S602. If it is determined that the failure diagnosis mode is not set, the present routine is brought to an end.

In step S602, the amount of overlap VOL is changed to a predetermined amount (for example, the maximum value), and then the process proceeds to step S603. Therefore, the predetermined failure diagnosis reference range is determined based on a map when the amount of overlap VOL is the maximum value.

In step S603, the execution permitting section determines whether or not the elapsed time is equal to or less than a predetermined period of time after a starting time point of communication between the combustion chamber 5 and the intake port 9. If it is determined that the elapsed time is equal to or less than the predetermined period of time, i.e., if the determination result is positive (YES), the execution of failure diagnosis is permitted so as to detect intake system pressure information, and the process then proceeds to step S604. In step S604, for example, a difference between the highest point (the maximum value of intake system pressure) and the lowest point (the minimum value of intake system pressure) reached in the elapsed time is defined as intake system pressure information dP, and the process then proceeds to step S605. On the other hand, if it is determined in step S603 that the elapsed time is not equal to or less than the predetermined period of time after the intake valve 11 is opened, the present routine is brought to an end.

In step S605, the comparing/determining section determines whether or not the intake system pressure information dP lies outside the predetermined failure diagnosis reference range. If it is determined that the intake system pressure information dP lies outside the predetermined failure diagnosis reference range, i.e., if the determination result is positive (YES), the process proceeds to step S606 wherein it is determined that the exhaust pressure increasing device has failed, and a signal indicative of a turning-on instruction is output to the failure alarm lamp 24. The present routine is then brought to an end.

On the other hand, if it is determined in step S605 that the intake system pressure information dP does not lie outside the predetermined failure diagnosis reference range, the process proceeds to step S607 wherein it is determined that the exhaust pressure increasing device is normal, and the determination that the exhaust pressure increasing device has failed is canceled as needed, and a signal indicative of a turning-off instruction is output to the failure alarm lamp 24. The present routine is then brought to an end.

As described above, the failure diagnostic system for the exhaust pressure increasing device according to the present embodiment determines whether the exhaust pressure increasing device has failed or not after the amount of overlap VOL is changed to a predetermined amount in step S602. Therefore, the ECU 50 does not have to hold a variety of maps, and only the above-mentioned map corresponding to the predetermined amount of overlap is required for failure diagnosis.

Figure 7:
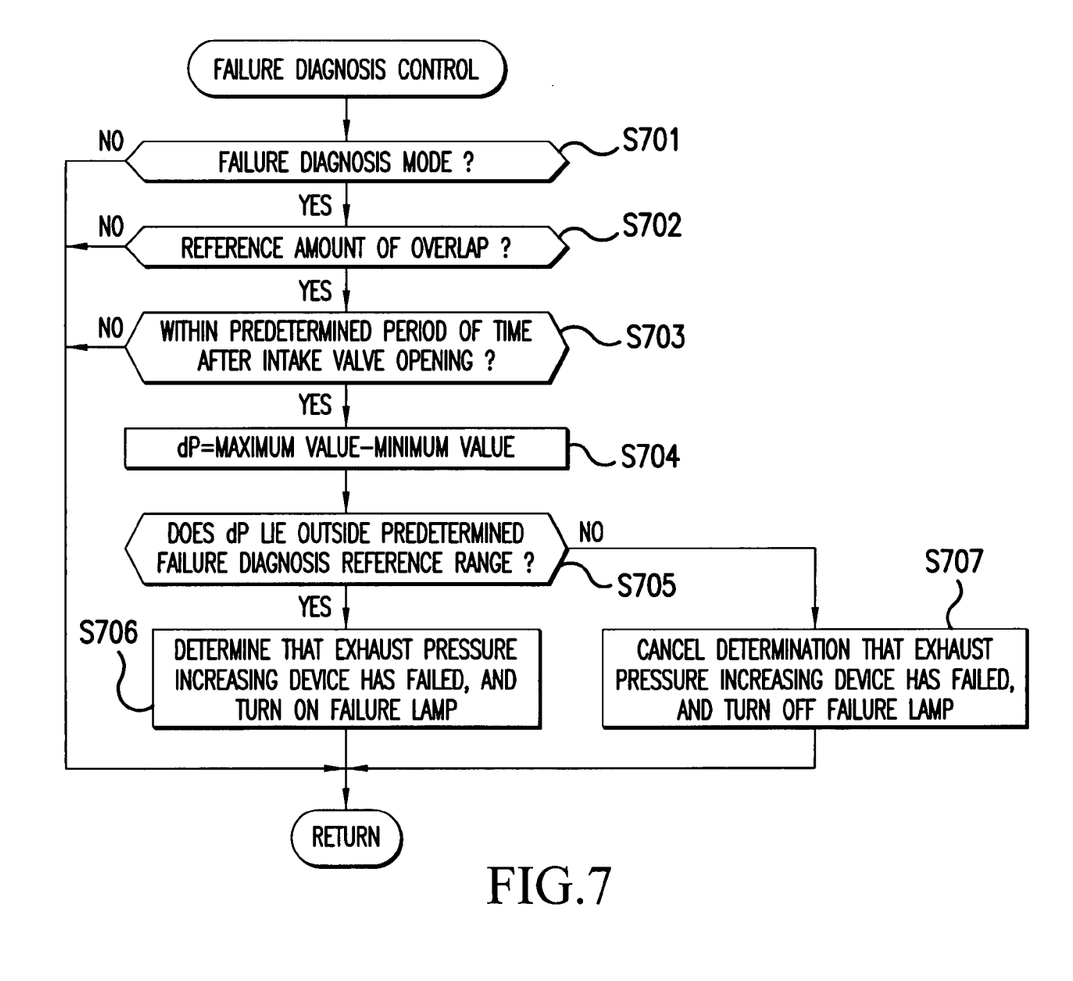
FIG. 7 is a flow chart showing a failure diagnosis control process carried out by a failure diagnostic system for an exhaust pressure increasing device according to a third embodiment of the present invention.

FIG. 7 is a flow chart showing a failure diagnosis control process carried out by a failure diagnostic system for an exhaust pressure increasing device according to a third embodiment of the present invention. It should be noted that the construction of the exhaust pressure increasing device according to the third embodiment is substantially identical with that of the exhaust pressure increasing device according to the first and second embodiments, and therefore description thereof is omitted, and the procedure of the failure diagnosis control process will be described in detail below.

In step S701, the execution permitting section determines whether a failure diagnosis mode is set or not. If it is determined that the failure diagnosis mode is set, i.e., if the determination result is positive (YES), the execution of failure diagnosis is permitted so as to detect intake system pressure information, and then the process proceeds to step S702. If it is determined that the failure diagnosis mode is not set, the present routine is brought to an end.

In step S702, the exclusion permitting section determines whether the amount of overlap VOL is equal to the reference amount of overlap. The reference amount of overlap means the amount of overlap which eliminates the necessity of correcting intake system pressure information or the predetermined failure diagnosis reference range, and is set so as to enable the comparing/determining section to make a determination as to intake system pressure information detected by the intake pipe pressure sensor 3. If it is determined that the amount of overlap VOL is equal to the reference amount of overlap, i.e., if it is determined that the determination result is positive (YES), the execution of failure diagnosis is permitted so as to detect intake system pressure information, and the process then proceeds to step S703, and if it is determined that the amount of overlap VOL is not equal to the reference amount of overlap, the present routine is brought to an end.

In step S703, the execution permitting section determines whether or not the elapsed time is equal to or less than a predetermined period of time after a starting time point of communication between the combustion chamber 5 and the intake port 9. If it is determined that the elapsed time is equal to or less than the predetermined period of time, i.e., if the determination result is positive (YES), the execution of failure diagnosis is permitted so as to detect intake system pressure information, and the process then proceeds to step S704. In step S704, a difference between the highest point (the maximum value of intake system pressure) and the lowest point (the minimum value of intake system pressure) reached in the elapsed time is defined as intake system pressure information dP, and the process then proceeds to step S705. On the other hand, if it is determined in step S703 that the elapsed time is not equal to or less than the predetermined period of time after the intake valve 11 is opened, the present routine is brought to an end.

In step S705, the comparing/determining section determines whether or not the intake system pressure information dP lies outside the predetermined failure diagnosis reference range. If it is determined that the intake system pressure information dP lies outside the predetermined failure diagnosis reference range, i.e., if the determination result is positive (YES), the process proceeds to step S706 wherein it is determined that the exhaust pressure increasing device has failed, and a signal indicative of a turning-on instruction is output to the failure alarm lamp 24. The present routine is then brought to an end.

On the other hand, if it is determined in step S705 that the intake system pressure information dP does not lie outside the predetermined failure diagnosis reference range, the process proceeds to step S707 wherein it is determined that the exhaust pressure increasing device is normal, and the determination that the exhaust pressure increasing device has failed is canceled as needed, and a signal indicative of a turning-off instruction is output to the failure alarm lamp 24. The present routine is then brought to an end.

As described above, the failure diagnostic system for the exhaust pressure increasing device according to the present embodiment uses intake pressure system information obtained when the amount of overlap is equal to the reference amount of overlap. Therefore, the subject of comparison can be uniformly found, and it is possible to determine whether the exhaust pressure increasing device has failed or not without the necessity of correcting the intake system pressure information and the predetermined failure diagnosis reference range with the amount of overlap being taken into account. As a result, failure diagnosis can be easily controlled.

Figure 8:
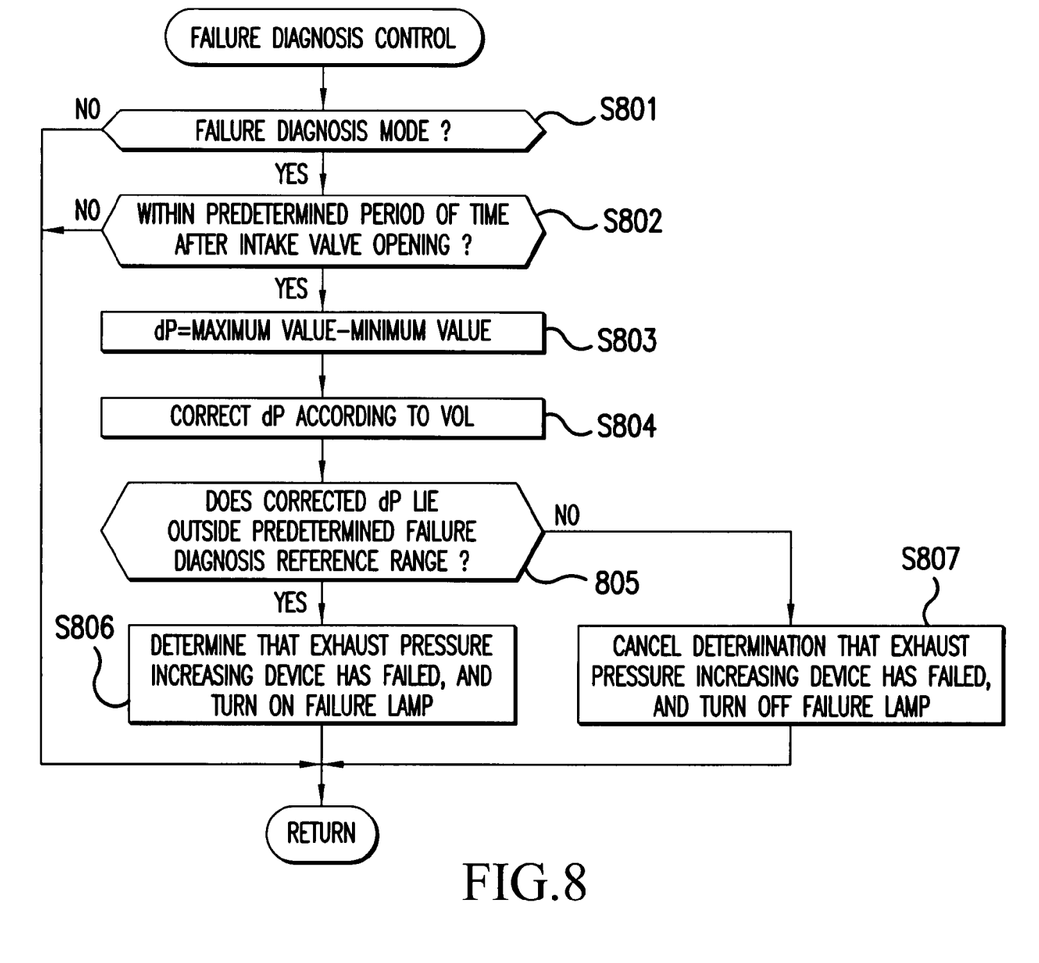
FIG. 8 is a flow chart showing a failure diagnosis control process carried out by a failure diagnostic system for an exhaust pressure increasing device according to a fourth embodiment of the present invention.

FIG. 8 is a flow chart showing a failure diagnosis control process carried out by a failure diagnostic system for an exhaust pressure increasing device according to a fourth embodiment of the present invention. It should be noted that the construction of the exhaust pressure increasing device according to the fourth embodiment is substantially identical with that of the exhaust pressure increasing device according to the first to third embodiments, and therefore description thereof is omitted, and the procedure of the failure diagnosis control process will be described in detail below.

In step S801, the execution permitting section determines whether a failure diagnosis mode is set or not. If it is determined that the failure diagnosis mode is set, i.e., if the determination result is positive (YES), the execution of failure diagnosis is permitted so as to detect intake system pressure information, and then the process proceeds to step S802. If it is determined that the failure diagnosis mode is not set, the present routine is brought to an end.

In step S802, the execution permitting section determines whether or not the elapsed time is equal to or less than a predetermined period of time after a starting time point of communication between the combustion chamber 5 and the intake port 9. If it is determined that the elapsed time is equal to or less than the predetermined period of time, i.e., if the determination result is positive (YES), the execution of failure diagnosis is permitted so as to detect intake system pressure information, and the process then proceeds to step S803. In step S803, a difference between the highest point (the maximum value of intake system pressure) and the lowest point (the minimum value of intake system pressure) reached in the elapsed time is defined as intake system pressure information dP, and the process then proceeds to step S804. On the other hand, if it is determined in step S802 that the elapsed time is not equal to or less than the predetermined period of time after the intake valve 11 is opened, the present routine is brought to an end.

In step S804, the subject converting section corrects the intake system pressure information dP according to the amount of overlap VOL, and the process then proceeds to step S805. Specifically, the subject of comparison in the comparing/determining section can be varied according to the amount of overlap, and hence the intake system pressure information dP to reduce the variation. More specifically, the subject of comparison is converted such that when the amount of overlap VOL is large, the intake system pressure information dP is corrected to the low voltage side due to a large amount of spit-back to the intake system, and when the amount of overlap VOL is small, the intake system pressure information dP is corrected to the high voltage side due to a small amount of spit-back to the intake system.

In step S805, the comparing/determining section determines whether or not the intake system pressure information dP lies outside the predetermined failure diagnosis reference range. If it is determined that the intake system pressure information dP lies outside the predetermined failure diagnosis reference range, i.e., if the determination result is positive (YES), the process proceeds to step S806 wherein it is determined that the exhaust pressure increasing device has failed, and a signal indicative of a turning-on instruction is output to the failure alarm lamp 24. The present routine is then brought to an end.

On the other hand, if it is determined in step S805 that the intake system pressure information dP does not lie outside the predetermined failure diagnosis reference range, the process proceeds to step S807 wherein it is determined that the exhaust pressure increasing device is normal, and the determination that the exhaust pressure increasing device has failed is canceled as the need arises, and a signal indicative of a turning-off instruction is output to the failure alarm lamp 24. The present routine is then brought to an end.

As described above, the failure diagnostic system for the exhaust pressure increasing device according to the present embodiment corrects intake system pressure information with the amount of overlap being taken into account. Therefore, the comparing/determining section can use the uniform amount of spit-back to the intake system to determine whether the exhaust pressure has failed or not irrespective of the amount of overlap, and thus, restrictions imposed on failure diagnosis timing can be eliminated.

Figure 9:
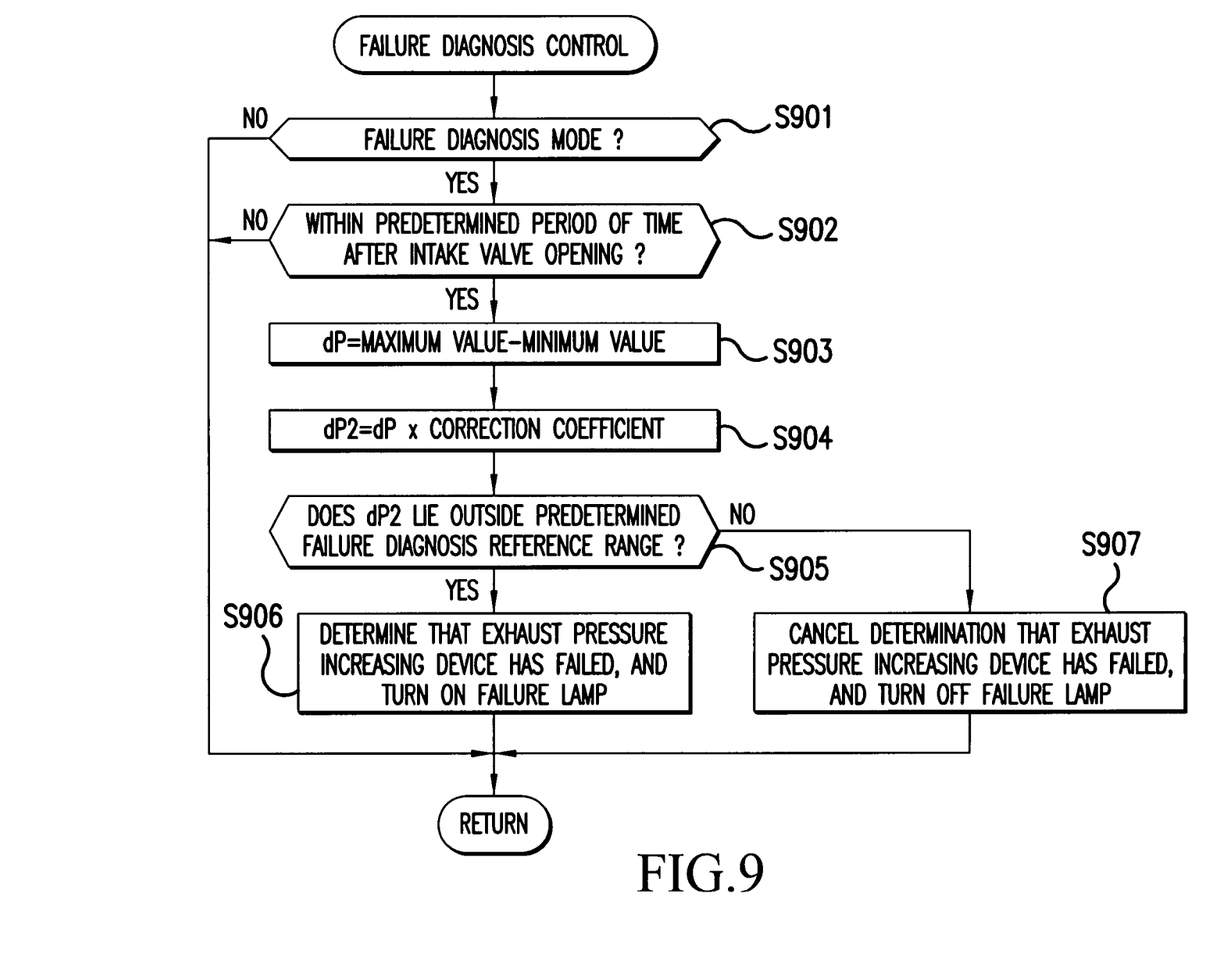
FIG. 9 is a flow chart showing a failure diagnosis control process carried out by a failure diagnostic system for an exhaust pressure increasing device according to a fifth embodiment of the present invention.

FIG. 9 is a flow chart showing a failure diagnosis control process carried out by a failure diagnostic system for an exhaust pressure increasing device according to a fifth embodiment of the present invention. It should be noted that the construction of the exhaust pressure increasing device according to the fifth embodiment is substantially identical with that of the exhaust pressure increasing device according to the fourth embodiment in which the subject converting section is provided, and therefore description thereof is omitted, and the procedure of the failure diagnosis control process will be described below.

In step S901, the execution permitting section determines whether a failure diagnosis mode is set or not. If it is determined that the failure diagnosis mode is set, i.e., if the determination result is positive (YES), the execution of failure diagnosis is permitted so as to detect intake system pressure information, and then the process proceeds to step S902. If it is determined that the failure diagnosis mode is not set, the present routine is brought to an end.

In step S902, the execution permitting section determines whether or not the elapsed time is equal to or less than a predetermined period of time after a starting time point of communication between the combustion chamber 5 and the intake port 9. If it is determined that the elapsed time is equal to or less than the predetermined period of time, i.e., if the determination result is positive (YES), the execution of failure diagnosis is permitted so as to detect intake system pressure information, and the process then proceeds to step S903. In step S903, a difference between the highest point (the maximum value of intake system pressure) and the lowest point (the minimum value of intake system pressure) reached in the elapsed time is defined as intake system pressure information dP, and the process then proceeds to step S904. On the other hand, if it is determined in step S902 that the elapsed time is not equal to or less than the predetermined period of time after the intake valve 11 is opened, the present routine is brought to an end.

In step S904, the subject converting section corrects the intake system pressure information dP according to an operative state relating to intake system pressure, i.e., multiplies the intake system pressure information dP by a correction coefficient to obtain corrected intake system pressure dP2, and the process then proceeds to step S905.

This is because the pressure of spit-back to the intake system is affected by the quantity of flow in the exhaust pipe 20, which is affected by the engine speed and the load applied to the engine 1 correlated to the valve opening speed of the intake valve 11; the valve opening speed of the intake valve 11 is increased as the engine speed rises.

Specifically, in the above described first to fifth embodiment, the exhaust pressure increase failure diagnostic section 51 detects the pressure of spit-back to the intake system as intake system pressure information, and defines the detected intake system pressure information as the exhaust system pressure to determine whether the exhaust pressure increasing device has failed or not. The pressure of spit-back to the intake system, however, is affected by an operative state relating to the intake system pressure, and therefore, if the intake system pressure information does not correspond to the exhaust system pressure, and the exhaust system pressure is estimated according to only the intake system pressure information, there may be an error to cause erroneous determination as to whether the exhaust pressure increasing device has failed or not.

As stated above, intake system pressure information may be required to be corrected according to an operative state relating to the intake system pressure, and hence the exhaust pressure increase failure diagnostic section 51 according to the present embodiment corrects the detected intake system pressure information according to an operative state relating to the intake system pressure, regards the pressure of spit-back to the intake system as the corrected intake system pressure information, and defines as the corrected intake system pressure information as the exhaust system pressure to determine whether the exhaust pressure increasing device has failed or not.

Specifically, in step S904, a correction coefficient which is properly determined in advance according to the engine speed and the volume efficiency or the exhaust flow rate is used, and the subject converting section converts the subject of comparison by correcting the intake system pressure information dP obtained in step S903 to the low voltage side when the valve opening speed of the intake valve 11, the load applied to the engine 1, or the flow rate in the exhaust pipe 20 is high, and on the other hand, correcting the intake system pressure information dP obtained in step S903 to the high voltage side when the valve opening speed of the intake valve 11, the load applied to the engine 1, or the flow rate in the exhaust pipe 20 is low.

It should be noted that the correction coefficient may be determined according to only the volume efficiency in the case where an electromagnetic intake valve is used and the valve opening speed thereof is fixed, and the intake air quantity may be used in place of the exhaust flow rate. Further, instead of the load applied to the engine 1 (in the present embodiment, the volume efficiency), a factor corrected thereto (such as the negative pressure in the intake channel, net average effective pressure, illustrated average effective pressure, exhaust temperature, cylinder pressure, angular velocity, the temperature of gas in cylinders in intake valve opening, or intake pipe negative pressure) may be used.

In step S905, the comparing/determining section determines whether or not the intake system pressure information dP2 obtained by multiplying the intake system pressure information dP by the correction coefficient lies outside the predetermined failure diagnosis reference range. If it is determined that the intake system pressure information dP2 lies outside the predetermined failure diagnosis reference range, i.e., if the determination result is positive (YES), the process proceeds to step S906 wherein it is determined that the exhaust pressure increasing device has failed, and a signal indicative of a turning-on instruction is output to the failure alarm lamp 24. The present routine is then brought to an end.

On the other hand, if it is determined in step S905 that the intake system pressure information dP2 does not lie outside the predetermined failure diagnosis reference range, the process proceeds to step S907 wherein it is determined that the exhaust pressure increasing device is normal, and the determination that the exhaust pressure increasing device has failed is canceled as needed, and a signal indicative of a turning-off instruction is output to the failure alarm lamp 24. The present routine is then brought to an end.

As described above, the failure diagnostic system for the exhaust pressure increasing device according to the present embodiment corrects intake system pressure information according to the valve opening speed of the intake valve 11, the engine applied to the engine 1, or the flow rate in the exhaust pipe 20. Specifically, the pressure of spit-back to the intake system is obtained by multiplying intake system pressure information by a correction coefficient, and hence the uniform pressure of spit-back to the intake system is used irrespective of an operative state relating to the intake system pressure to determine whether the exhaust pressure increasing device has failed or not. Therefore, it is possible to prevent erroneous failure diagnosis.

Further, since the pressure of spit-back to the intake system is found with the engine speed being taken into account, the effects of pulsation can be reduced, since pulsation is greatly correlated to the engine speed.

It should be understood that the present invention is not limited to the embodiments described above, but various variations of the above described embodiments may be possible without departing from the spirits of the present invention, including variations as described below.

For example, although the execution permitting section uses the predetermined diagnosis mode amount in the first embodiment, the amount of overlap is changed to the predetermined amount in the second embodiment, the execution permitting section sets the reference amount of overlap in the third embodiment, and the subject converting section corrects the intake system pressure information in the fourth and fifth embodiments, the present invention is not limited to this, but whether the exhaust pressure increasing device has failed or not can be determined in a reliable manner by appropriately combining the first to fifth embodiments.

Further, although in the above described fourth and fifth embodiments, the intake system pressure information is corrected according to an operative state relating to the amount of overlap or the intake system pressure, the present invention is not limited to this, but the predetermined failure diagnosis reference range may be corrected according to an operative state relating to the amount of overlap or the intake system pressure.

Further, the intake system pressure information may be the maximum value, the minimum value, a difference between the maximum value and the minimum value, the average value of the maximum value and the minimum value, or the like, and the failure diagnosis reference range may be determined accordingly.

Further, it is preferred that the intake pipe pressure sensor is provided in the vicinity of the combustion chamber so as to prevent pressure wave from being attenuated by a surge tank or the like, but in the case where the pressure of spit-back to the intake system can be detected based on the internal pressure of the surge tank, the intake pipe pressure sensor should not necessarily be mounted on the intake manifold as in the above described embodiments.

Further, under such operating conditions (e.g., high-speed/high-load operating conditions) that the exhaust pressure is increased with the sealed type switching valve 40 being unoperated, failure diagnosis can be carried out with a higher accuracy by taking the amount of increase in exhaust pressure into account, or by excluding the corresponding operating range from a failure diagnosis range. It should be noted that to take the amount of increase in exhaust pressure into account, intake system pressure information can be obtained by subtracting the amount of increase in exhaust pressure from the maximum value of intake system pressure, but any other methods may be used.

Further, the maximum value of intake system pressure or the like may be converted into the exhaust pressure to determine whether the exhaust pressure increasing device has failed or not.

Further, either a cylinder injection type engine or a diesel engine as well as the above-mentioned MPI type engine may be used as the internal combustion engine used for the failure diagnostic system for the exhaust pressure increasing device according to the present invention. In this case as well, whether the exhaust pressure increasing device has failed or not can be determined at a low cost and with a high accuracy.

We claim:

1. A failure diagnostic system for an exhaust pressure increasing device, comprising:
    an intake channel and an exhaust channel in communication with a cylinder of an internal combustion engine;
    an exhaust pressure increasing device that increases an exhaust system pressure of said exhaust channel;
    an intake system pressure detecting device provided in said intake channel, for detecting an intake system pressure;
    an intake valve that selectively allows and prohibits communication between the intake channel and the cylinder; and
    an exhaust pressure increase failure diagnostic unit that determines as to whether the exhaust pressure increasing device has failed based on a maximum intake pressure generated due to a spit-back of a combustion gas in the cylinder towards the intake channel after intake valve has allowed the intake channel to communicate with the cylinder and prior to an occurrence of an exhaust pulsation or an intake pulsation, and a predetermined failure diagnosis reference range.

2. A failure diagnostic system according to claim 1, further comprising:
a failure notifying device that notifies a failure when said exhaust pressure increase failure diagnostic section determines that the exhaust pressure increasing device has failed.

3. A failure diagnostic system for an exhaust pressure increasing device, comprising:
an intake channel and an exhaust channel in communication with cylinders of an internal combustion engine;
an exhaust pressure increasing device that increases an exhaust system pressure of said exhaust channel;
an intake system pressure detecting device provided in said intake channel, for detecting an intake system pressure; and
an exhaust pressure increase failure diagnostic section that determines as to whether the exhaust pressure increasing device has failed according to intake system pressure information obtained by said intake system pressure detecting device and a predetermined failure diagnosis reference range;
an intake valve and an exhaust valve that open and close an intake opening and an exhaust opening, respectively, of a combustion chamber in the cylinders; and
a valve timing changing device that changes at least one of valve closing timing of said exhaust valve and valve opening timing of said intake valve,
wherein said exhaust pressure increase failure diagnostic section determines as to whether the exhaust pressure increasing device has failed when an amount of overlap of the valve closing timing of said exhaust valve and the valve opening timing of said intake valve is equal to or greater than a predetermined amount.

4. A failure diagnostic system according to claim 3, wherein said exhaust pressure increase failure diagnostic section determines as to whether the exhaust pressure increasing device has failed according to the intake system pressure information obtained when the amount of overlap is equal to a reference amount of overlap.

5. A failure diagnostic system according to claim 3, wherein:
the exhaust pressure increase failure diagnostic section comprises a subject converting section that carries out conversion of a subject of comparison in making the determination as to whether the exhaust pressure increasing device has failed; and
said subject converting section carries out conversion of the subject of comparison by correcting the intake system pressure information to a low voltage side or the predetermined failure diagnosis reference range to a high reference side when the amount of overlap is great, and correcting the intake system pressure information to a high voltage side or the predetermined failure diagnosis reference range to a low reference side when the amount of overlap is small.

6. A failure diagnostic system according to claim 3, wherein:
the exhaust pressure increase failure diagnostic section comprises a subject converting section that carries out conversion of a subject of comparison in making the determination as to whether the exhaust pressure increasing device has failed; and
said subject converting section carries out conversion of the subject of comparison by correcting the intake system pressure information to a low voltage side or correcting the predetermined failure diagnosis reference range to a high reference side when a valve opening speed of said intake valve, a load applied to the internal combustion engine, or a flow rate of exhaust in said exhaust channel is high, and correcting the intake system pressure information to a high voltage side or correcting the predetermined failure diagnosis reference range to a low reference side when the valve opening speed, the load, or the flow rate is low.

7. A vehicle including an internal combustion engine, comprising:
an intake channel and an exhaust channel in communication with cylinders of an internal combustion engine;
an intake valve and an exhaust valve that open and close an intake opening and an exhaust opening, respectively, of a combustion chamber in the cylinders;
a valve timing changing device that changes at least one of valve closing timing of said exhaust valve and valve opening timing of said intake valve;
an exhaust pressure increasing device that increases an exhaust system pressure of said exhaust channel;
an intake system pressure detecting device provided in said intake channel, for detecting an intake system pressure; and
an exhaust pressure increase failure diagnostic section that determines as to whether the exhaust pressure increasing device has failed according to intake system pressure information obtained by said intake system pressure detecting device and a predetermined failure diagnosis reference range when an amount of overlap of the valve closing timing of said exhaust valve and the valve opening timing of said intake valve is equal to or greater than a predetermined amount.

8. A method for detecting failure in an exhaust pressure increasing device for increasing an exhaust system pressure provided in an exhaust channel of an internal combustion engine, the method comprising:
detecting a pressure inside an intake channel of the internal combustion engine; and
determining as to whether the exhaust pressure increasing device has failed based on a maximum detected intake pressure generated due to a spit-back of a combustion gas in a cylinder towards the intake channel after an intake valve has allowed the intake channel to communicate with a cylinder of the internal combustion engine, and a predetermined failure diagnosis reference range.

9. The method according to claim 8, further comprising:
notifying a failure when said determining step determines that the exhaust pressure increasing device has failed.

10. A failure diagnostic system according to claim 1, wherein the predetermined failure diagnosis reference range is set based on a parameter including an extent that the exhaust pressure increasing device is throttling the exhaust channel, an amount of overlap between the intake valve and an exhaust valve, an engine speed, an intake air quantity, and an atmospheric pressure.

11. A failure diagnostic system for an exhaust pressure increasing device, comprising:
an intake channel and an exhaust channel in communication with a cylinder of an internal combustion engine;
an exhaust pressure increasing device that increases an exhaust system pressure of said exhaust channel;

an intake system pressure detecting device provided in said intake channel, for detecting an intake system pressure;

an intake valve that selectively allows and prohibits communication between the intake channel and the cylinder; and an exhaust pressure increase failure diagnostic unit that determines as to whether the exhaust pressure increasing device has failed based on a minimum intake pressure detected after the intake valve has allowed the intake channel to communicate with the cylinder and prior to an occurrence of an exhaust pulsation or an intake pulsation, and a predetermined failure diagnosis reference range.

12. A failure diagnostic system according to claim 11, wherein the exhaust pressure increase failure diagnostic unit further determines a maximum intake pressure generated due to a spit-back of a combustion gas in the cylinder towards the intake channel after the intake valve has allowed the intake channel to communicate with the cylinder and prior to the occurrence of the exhaust pulsation or the intake pulsation, and determines as to whether the exhaust pressure increasing device has failed based on a difference between the minimum intake pressure and the maximum intake pressure, and the predetermined failure diagnosis reference range.

13. A failure diagnostic system according to claim 12, wherein the difference is corrected based on an overlap between the intake valve and an exhaust valve.

14. A failure diagnostic system according to claim 12, wherein the difference is corrected based on a correction coefficient.

* * * * *